(12) United States Patent
Kim et al.

(10) Patent No.: US 6,823,099 B2
(45) Date of Patent: Nov. 23, 2004

(54) OPTICAL BENCH

(75) Inventors: Jin-hwan Kim, Gyeonggi-do (KR); Hyung Choi, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 09/984,735

(22) Filed: Oct. 31, 2001

(65) Prior Publication Data

US 2002/0126950 A1 Sep. 12, 2002

(30) Foreign Application Priority Data

Mar. 7, 2001 (KR) ........................................ 2001-11731

(51) Int. Cl.[7] .................................................. G02B 6/35
(52) U.S. Cl. .............................. 385/18; 385/17; 385/39
(58) Field of Search ............................. 385/14–19, 24, 385/39, 52

(56) References Cited

U.S. PATENT DOCUMENTS

| | | | |
|---|---|---|---|
| 5,841,917 A | * | 11/1998 | Jungerman et al. ........... 385/17 |
| 6,363,182 B2 | * | 3/2002 | Mills et al. ................... 385/17 |
| 6,449,406 B1 | * | 9/2002 | Fan et al. ..................... 385/17 |
| 2002/0164113 A1 | * | 11/2002 | Rensing et al. ............... 385/18 |

FOREIGN PATENT DOCUMENTS

| | | |
|---|---|---|
| JP | 54-161951 | 12/1979 |
| JP | 54-161952 | 12/1979 |
| JP | 63-261214 | 10/1988 |
| JP | 2-5707 | 1/1990 |
| JP | 5-134195 | 5/1993 |
| JP | 08-248235 | 9/1996 |
| JP | 2000-98270 | 4/2000 |

* cited by examiner

*Primary Examiner*—John D. Lee
*Assistant Examiner*—Sarah Song
(74) *Attorney, Agent, or Firm*—Staas & Halsey LLP

(57) ABSTRACT

An optical bench with improved structure, in which tolerance for misalignment of optical elements becomes great with shortened optical path, the optical bench including a substrate and input and output optical fibers arranged on the substrate with a predetermined separation gap therebetween, where far ends of the input and output optical fibers form a zigzag pattern to guide input and output beams. Input and output optical elements are arranged at the far end of each input and output optical fiber, respectively, condensing and/ or diverging the input and output beams. Micro-mirrors receive the input beam from the input optical elements and reflecting the received input beam toward predetermined channels.

21 Claims, 7 Drawing Sheets

OPTICAL BENCH

CROSS-REFERENCE TO RELATED APPLICATIONS

This application claims the benefit of Korean Application No. 2001-11731, filed Mar. 7, 2001, in the Korean Industrial Property Office, the disclosure of which is incorporated herein by reference.

BACKGROUND OF THE INVENTION

1. Field of the Invention

The present invention relates to an optical bench, and more particularly, to an optical bench with improved structure, in which an optical path is shortened and tolerance is high for misalignment of optical elements.

2. Description of the Related Art

Recently, with an increase in an amount of data transmitted through an optical communications network, data transfer methods for an optical communication system are changing to wavelength division multiplexing (WDM) transfer methods. As such WDM systems need a connection between networks and an optical crossing connector, i.e., an optical bench, which is considered an essential element of the WDM systems.

Figure 1:
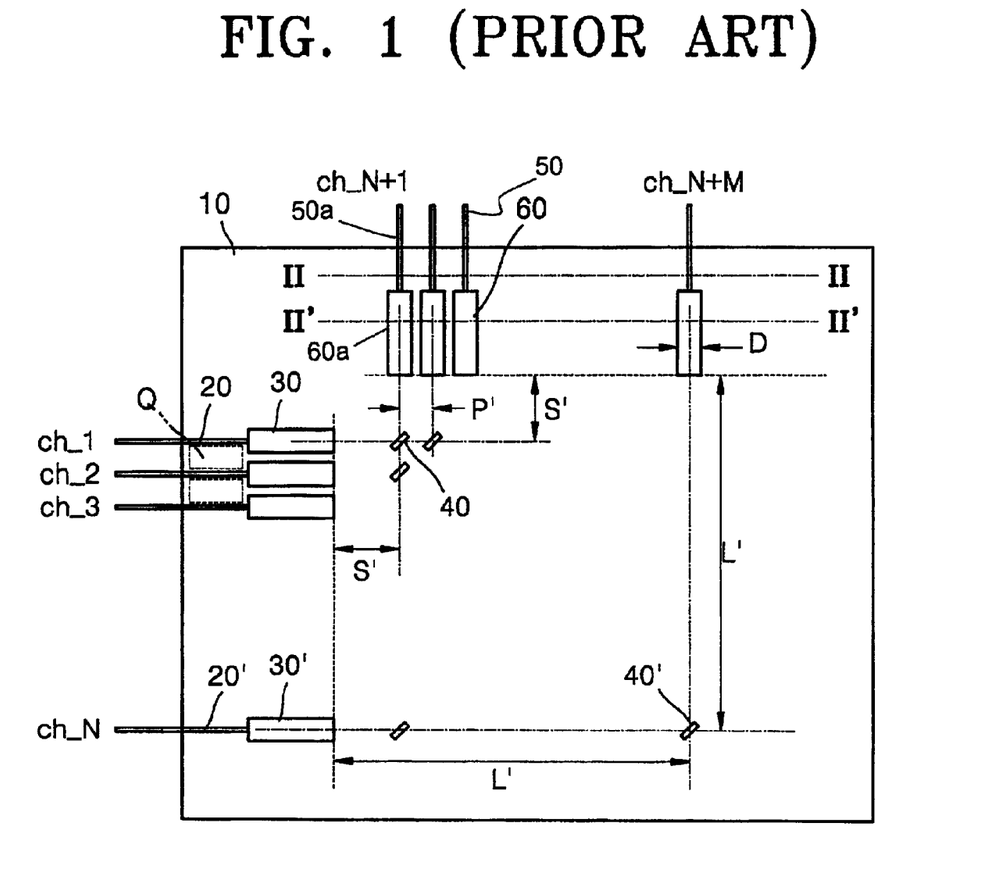
FIG. 1 shows a structure of a conventional optical bench.

In a conventional optical bench, as shown in FIG. 1, a plurality of micro-mirrors 40 are arranged in a matrix on a substrate 10. The substrate 10 includes a plurality of input optical fibers 20, each transferring an optical signal to the micro-mirrors 40, and a plurality of output optical fibers 50, each receiving and transmitting an optical signal reflected from the micro-mirror 40. A plurality of input and output optical elements 30 and 60 for condensing and/or diverging an incident beam are arranged between the micro-mirrors 40 and the input and output optical fibers 20 and 50.

Figure 2:
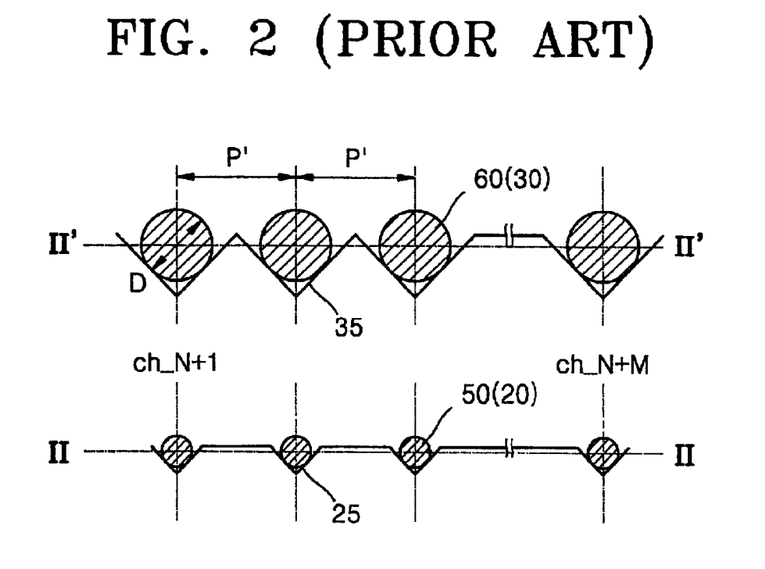
FIG. 2 shows cross-sections taken along lines II—II and II'-II' of FIG. 1.

As shown in FIG. 2, the input and output optical fibers 20 and 50 are placed in parallel first V-grooves 25 arranged with a predetermined separation gap therebetween, and the input and output optical elements 30 and 60 are placed in second V-grooves 35 connected to the first V-grooves 25. The input and output optical fibers 20 and 50 are aligned with the input and output optical elements 30 and 60, respectively, along a line. The input optical fiber 20 and the input optical element 30 are aligned in one optical axis with the micro-mirrors 40 and the output optical fiber 50 and the output optical element 60 are aligned in another optical axis with the micro-mirrors 40.

For the optical bench having the configuration described above, a light beam emitted from a light source (not shown) enters one of the input optical fibers 20 and a corresponding input optical element 30. The light beam is then reflected by a predetermined micro-mirror 40. The light beam reflected by the micro-mirror 40 is output through one of the output optical elements 60 and a corresponding output optical fiber 50.

An optical path of an incident beam can be changed toward an intended output channel by positioning the micro-mirrors 40 flat or upright on the substrate 10. In particular, when the micro-mirrors 40 are positioned upright on the substrate 10, the incident beam is reflected by the micro-mirrors 40 towards the intended output channel. When the micro-mirrors 40 are positioned flat on the substrate 10, the incident beam goes straight, passing over the micro-mirrors 40 without being reflected.

When transferring the optical signal to the intended channel by changing the optical path, as described above, a minimum optical path is formed when an input optical signal received from, for example, an input channel ch_1, through the input optical fiber 20 and the input optical element 30, reaches the micro-mirror 40 nearest to the input optical element 30 through an optical path S', and is reflected by the micro-mirror 40. The optical signal is output through the optical path S', an output optical element 60a, an output optical fiber 50a, and an output channel ch_(N+1). In this case, the minimum optical path is formed as 2S'.

Meanwhile, a maximum optical path is formed when the optical signal received from an input channel ch_N through an input optical fiber 20' and an input optical element 30' reaches a micro-mirror 40' farthest from the input optical element 30' through an optical path L', and is reflected by the micro-mirror 40' and enters an output optical channel ch_(N+M) through an optical path L'. Here, M is the number of output channels, and N is the number of input channels. Supposing M is equal to N, a maximum optical path 2L' can be expressed as formula (1), using the unit optical path S' and a channel pitch P' between each input and output optical element 30 (60):

$$2L' = 2(S' + (N-1)P') \quad (1)$$

The channel pitch P' is greater than a diameter D of each optical element 30 and 60 because the input and output optical elements 30 and 60 typically do not perfectly fit into the second V-grooves 35 for the structural characteristic of the V-shaped grooves. Thus, the greater the diameter of the optical elements 30 and 60, the greater the channel pitch P' and the greater the maximum optical path 2L'.

Figure 3:
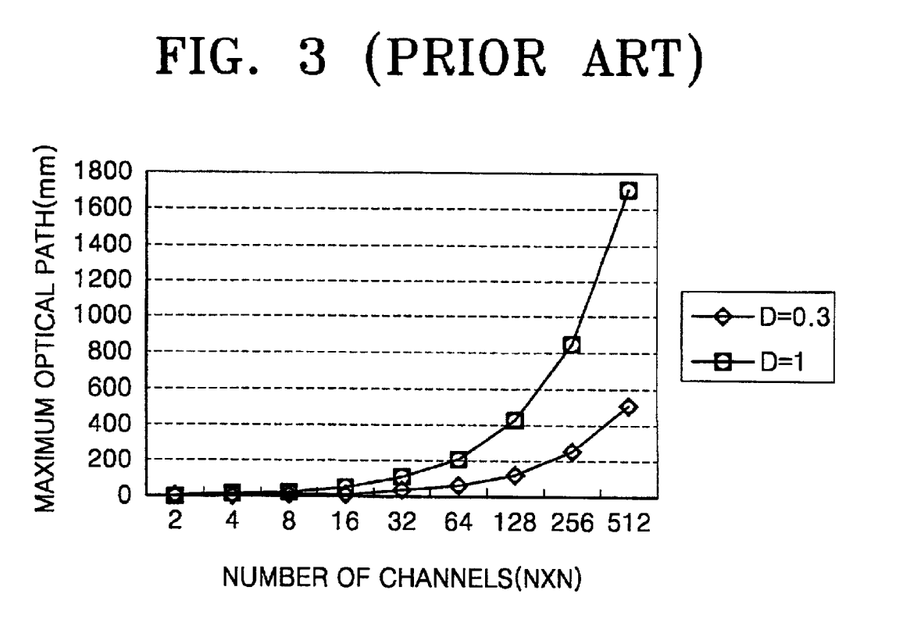
FIG. 3 is a graph showing variations in length of a maximum optical path with respect to a number of channels.

FIG. 3 shows the maximum optical path 2L' for each N×N channel structure when the input and output optical elements 30 and 60 have a diameter (D) of 0.3 mm and 1 mm, respectively, and the unit optical path S' is equal to 1 mm. For this maximum optical path calculation, the channel pitch P' is determined to be 66% greater than the diameter (D) of optical element.

In FIG. 3, it is apparent that the length of the maximum optical path 2L' markedly increases with an increased number N of channels. For example, for a 128×128 channel structure, when the input and output optical elements 30 and 60 have a diameter (D) of 1 mm, the optical signal should travel a distance 400 times greater than the diameter (D) of the input and output optical elements 30 and 60. As the optical path becomes longer, optical path alignment becomes difficult. Thus, to maintain optical efficiency, an error in reflection angle of the micro-mirror, and an alignment error between the optical elements and optical fibers or between the optical elements and micro-mirrors should be precisely controlled to be small. As a result, manufacturing cost increases due to an increase in assembly expense.

SUMMARY OF THE INVENTION

Various objects and advantages of the invention will be set forth in part in the description that follows and, in part, will be obvious from the description, or may be learned by practice of the invention.

To solve the above-described problems, it is an object of the present invention to provide an optical bench with an improved structure in which optical fibers and optical elements are arranged in a staggered fashion to reduce a maximum optical path and tolerance for misalignment of the optical fibers or micro-mirrors becomes great.

To achieve the above and other objects of the present invention, there is provided an optical bench including: a substrate; input and output optical fibers arranged on the substrate with a predetermined separation gap therebetween, wherein far ends of the input and output optical fibers form a zigzag pattern to guide input and output beams; input and output optical elements arranged at the far end of each input and output optical fiber, respectively, condensing and/or diverging the input and output beams; and micro-mirrors receiving the input beam from the input optical elements and reflecting the received input beam toward predetermined channels.

The optical bench satisfies a relation of $P \leq D$, where P is a channel pitch and D is a diameter of the input and output optical elements.

The input optical fibers and the input optical elements, or the output optical fibers and the output optical elements are arranged on different planes.

The input and output optical fibers and the input and output optical elements are arranged as multiple layers and the arrangement for each multiple layer alternates.

To achieve the above and other objects of the present invention, an optical bench is provided, including: a substrate; input and output optical fibers arranged in a staggered pattern on the substrate guiding input and output beams; input and output optical elements arranged at a far end of each input and output optical fiber, respectively; and micro-mirrors receiving the input beam from the input optical elements and reflecting the received input beam toward the output optical elements.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

Figure 4:
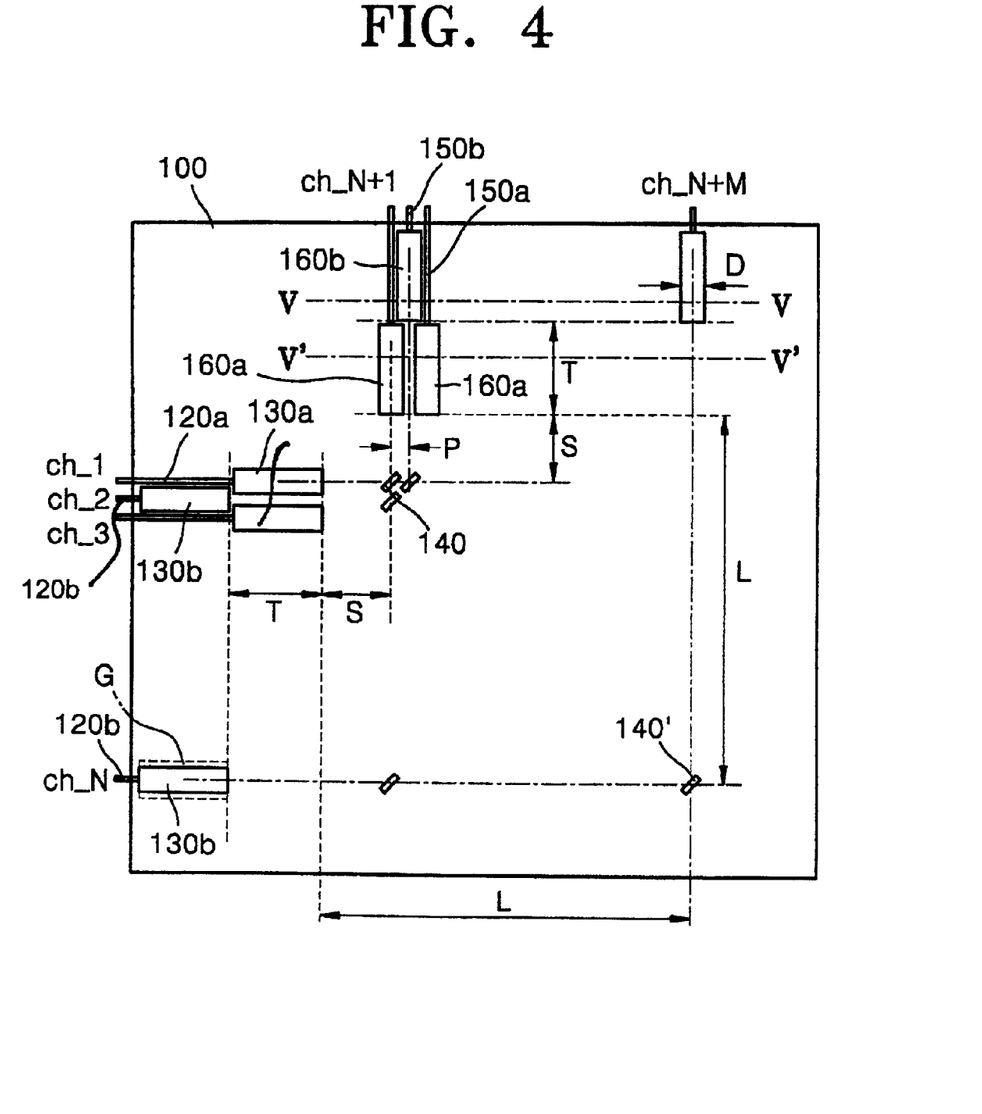
FIG. 4 shows a structure of an embodiment of an optical bench according to the present invention.

As shown in FIG. 4, a preferred embodiment of an optical bench according to the present invention includes a substrate 100, input and output optical fibers 120a, 120b, 150a, and 150b arranged on the substrate 100 with a predetermined separation gap therebetween. The input and output optical fibers 120a, 120b, 150a, and 150b guide input and output beams, respectively. Input and output optical elements 130a, 130b, 160a, and 160b are arranged on the substrate 100 in a staggered fashion in connection with the input and output optical fibers 120a, 120b, 150a, and 150b. A plurality of micro-mirrors 140 are arranged in a matrix on the substrate 100, for reflecting a light beam from the input optical elements 130a and 130b towards a predetermined output channel.

In the optical bench having the configuration described above, a light beam emitted from a light source (not shown) enters the input optical fibers 120a and 120b and the input optical elements 130a and 130b and is reflected by the micro-mirrors 140. The light beam reflected by the micro-mirrors 140 is output through the output optical elements 160a and 160b and the output optical fibers 150a and 150b. The input and output optical elements 130a, 130b, 160a, and 160b may be elements for condensing or diverging an incident beam, for example, a ball lens, a green lens, or a collimating lens.

Figure 5:
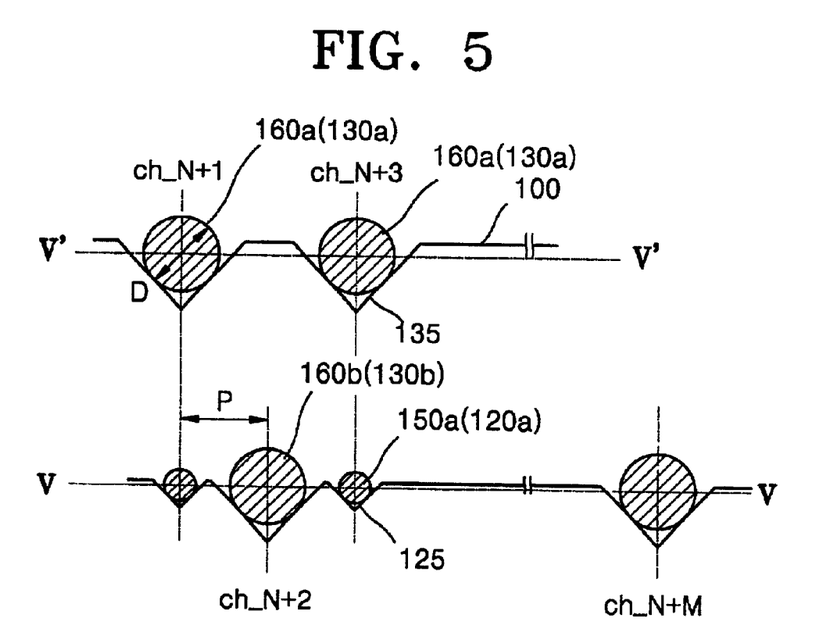
FIG. 5 shows cross-sections taken along lines V—V and V'-V' of FIG. 4.

Referring to FIG. 5, the input and output optical fibers 120a, 120b, 150a, and 150b are placed in first V-grooves 125 and the input and output optical elements 130a, 130b, 160a, and 160b are placed in second V-grooves 135. The micro-mirrors 140 are tilted 45° with respect to the input and output optical elements 130a, 130b, 160a, and 160b, and upright on the substrate 100 to reflect the incident light beam toward the output optical elements 160a and 160b. Alternatively, the micro-mirrors 140 can be actuated to change an optical path, such that the micro-mirrors 140 are laid flat on the substrate 10 and the incident light beam goes straight.

The input and output optical fibers 120a, 120b, 150a, and 150b are arranged in the first V-grooves 125 with a predetermined separation gap therebetween such that far ends of even input and output optical fibers 120b and 150b are closer to an edge of the substrate 100 than far ends of odd input and output optical fibers 120a and 150a. The input and output optical fibers 120a, 120b, 150a and 150b form a zigzag pattern with the far ends of the odd and even input and output optical fibers 120a, 120b, 150a and 150b, leaving a space G (as shown in FIG. 4) between neighboring odd input and output optical fibers 120a and 150a away from the far end of each of the even input and output optical fibers 120b and 150b. Odd input and output optical elements 130a and 160a are arranged at the far ends of the odd input and output optical fibers 120a and 150a, and even input and output optical elements 130b and 160b are arranged in the spaces G. It will be appreciated that the arrangement of the even optical fibers and optical elements 120b, 150b, 130b, and 160b and that of the odd optical fibers and optical elements 120a, 150a, 130a, and 160a may be interchangeable.

The space G is designed so as to utilize an unnecessary space formed due to a difference in width between the second V-grooves 135 for the input and output optical elements 130a and 160a, and the first V-grooves 125 for the input and output optical fibers 120a, and 150a and input and output optical elements 130b and 160b. In particular, as shown in FIG. 1, when the input and output optical elements 30 and 60 are arranged along a line, an unnecessary space Q, which corresponds to the difference in width between the first V-grooves 25 and second V-grooves 35, is formed. As a result, the optical path is much longer than necessary due to the unnecessary space Q. The optical bench according to the present invention utilizes the unnecessary space Q as a space for the optical elements, thereby minimizing the optical path.

Alternatively, the input and output optical fibers 120a, 120b, 150a, and 150b, and the input and output optical elements 130a, 130b, 160a, and 160b, which are arranged in a staggered fashion, may be formed as a multi-layer structure to further efficiently shorten the optical path. In this case, the arrangement of the optical fibers and the optical elements between layers may alternate.

Minimum and maximum optical paths in the optical bench according to the present invention will be described. In FIG. 4, "S" denotes a unit optical path which is the shortest optical path between the odd input and output optical elements 130a and 160a and corresponding micro-mirrors 140 which are the nearest to the same. "L" denotes an optical path corresponding to a distance between the odd input and output optical elements 130a and 160a and corresponding micro-mirrors 140 which are the farthest to the same. "T" denotes a length of the input and output optical elements 130a and 160a, and "P" denotes a channel pitch corresponding to a distance between each optical fiber 120a, 120b, 150a, and 150b.

A minimum optical path is formed when the incident beam input through an input channel ch_1 passes the odd input optical element 130a and the optical path S and is reflected by a micro-mirror 140, which is the nearest to the odd input optical element 130a, and outputs through the optical path S and an output channel ch_(N+1). In this case, the minimum optical path corresponds to 2S.

A maximum optical path of the optical bench according to the present invention is formed when the incident beam input through an input channel ch_N passes the even input optical element 130b and the incident beam is reflected by the micro-mirror 140', which is the farthest micro-mirror from the even input optical element 130b at a distance corresponding to the length T of each optical element and the optical path L. The incident beam outputs through an optical path L, the distance T, and an output channel ch_(N+M). Here, M is the number of output channels, and N is the number of input channels. Supposing M is equal to N, the maximum optical path (2(T+L)) can be expressed as formula (2):

$$2(T+L)=2\{(T+S)+(N-1)P\} \quad (2)$$

The length T of the input and output optical elements 130a, 130b, 160a, and 160b is about a few millimeters, so an increase in the optical path by the length T is negligible. The channel pitch P is less than or equal to a diameter D of the input and output optical elements 130a, 130b, 160a, and 160b because the input and output optical elements 130a, 130b, 160a, and 160b adjacent to each other have an overlapping portion due to their arrangement in a staggered fashion. That is, a relation between the channel pitch P and the diameter D of the optical elements satisfies:

$$P \leq D \quad (3)$$

Figure 6:
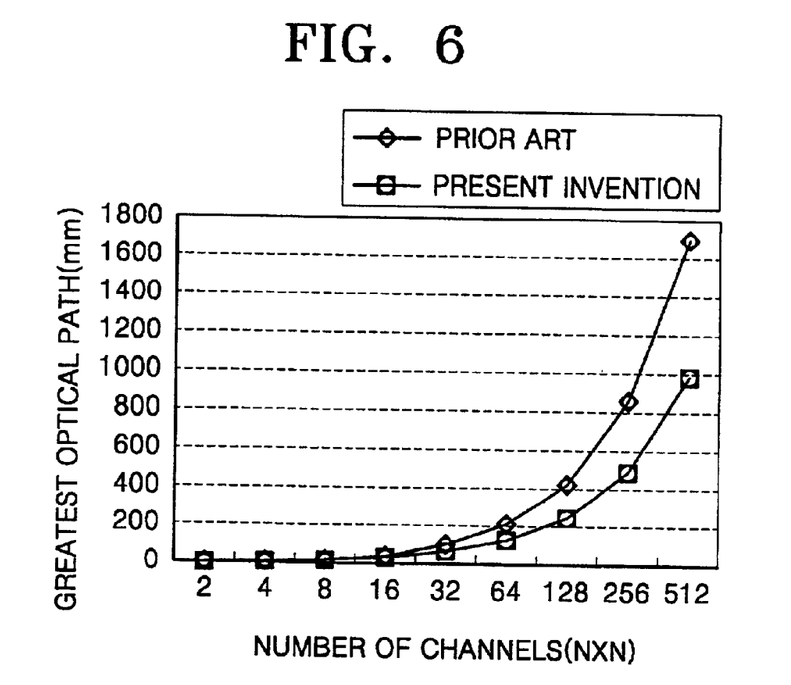
FIG. 6 comparatively shows variations in length of a maximum optical path with respect to the number of channels for the conventional optical bench and for the optical bench according to the present invention.

FIG. 6 comparatively shows variations in length of the maximum optical path with respect to a number of channels, for the conventional optical bench in which the optical fibers and optical elements are arranged along a line and for the optical bench according to the present invention in which the optical fibers and optical elements are arranged in a staggered fashion. In this instance, the unit optical path S is 1 mm and the input and output optical elements 130a, 130b, 160a, and 160b have a length T of 3 mm and a diameter of 1 mm. As shown in FIG. 6, for a 128×128 channel structure, the maximum optical path of the present invention is about 200 mm shorter than that of the conventional optical bench. The greater the number of channels, the greater the difference in length of the maximum optical path between the present invention and prior art.

Alternatively, although the optical fibers and optical elements are arranged in a staggered fashion on the same plane in the embodiment described above, the optical fibers and the optical elements may be arranged as multiple layers or on different planes in such staggered fashion. When there is a need to arrange the input optical fibers 120a and 120b, output optical fibers 150a, 150b, or input and output optical elements 130a, 130b, 160a, and 160b on different planes, the optical path can be shortened by arranging the optical fibers 120a, 120b, 150a, and 150b and the optical elements 130a, 130b, 160a, and 160b in a staggered fashion.

Figure 7:
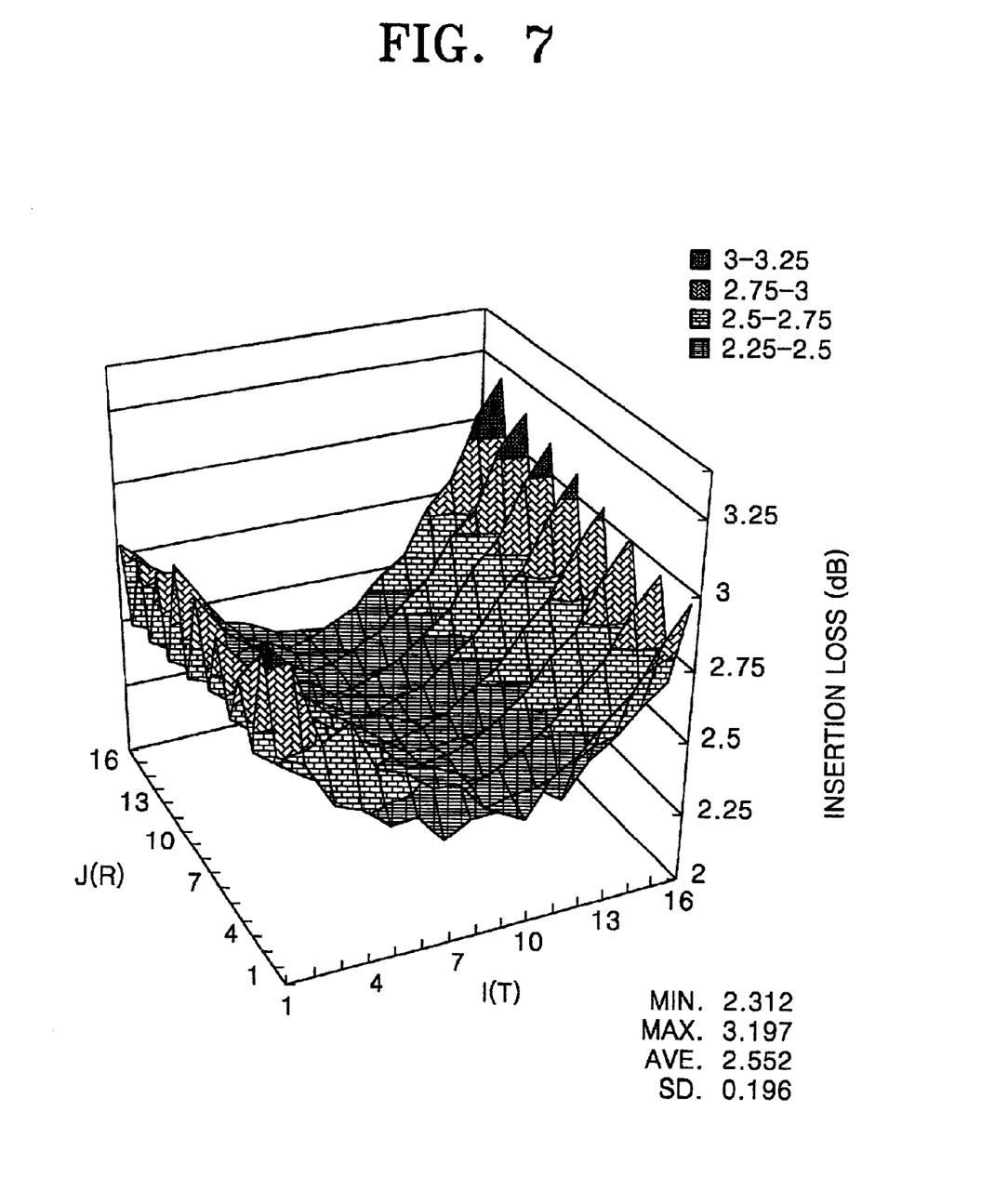
FIG. 7 is a graph showing an insertion loss of the optical bench according to the present invention for a 16×16 channel structure.

FIG. 7 is a graph showing the insertion loss of the optical bench according to the present invention, in which the input and output optical fibers 120a, 120b, 150a, and 150b and the input and output optical elements 130a, 130b, 160a, and 160b are arranged in a staggered fashion, when the micro-mirrors are arranged to be suitable for a 16×16 channel structure. An insertion loss of beam in the input line I(T) and output line J(R) is measured in dB. A maximum insertion loss (Max) is 3.197 dB and a minimum insertion loss (Min) is 2.312 dB. An average maximum insertion loss (Ave) is 2.552 with a standard deviation (SD) of 0.196.

Figure 8:
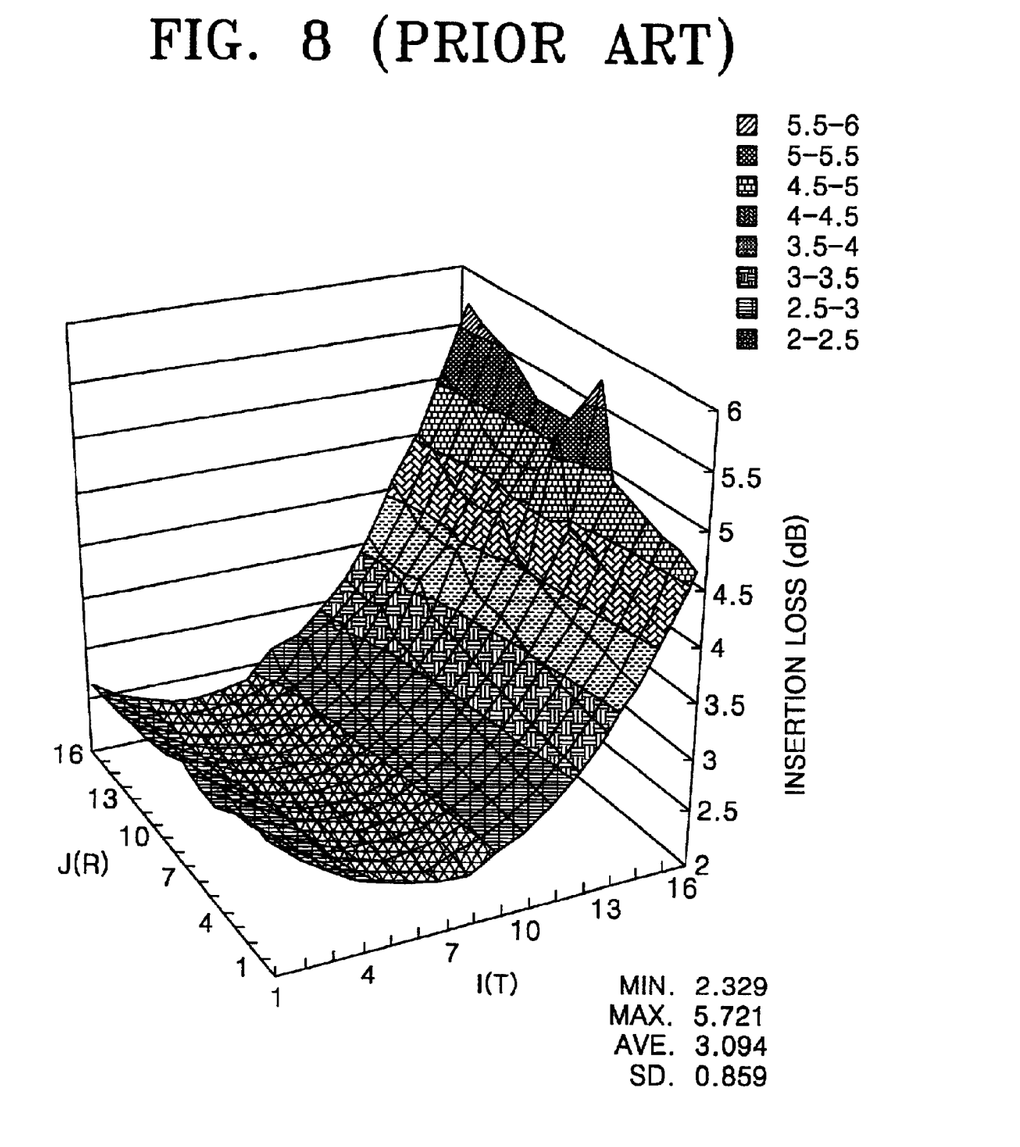
FIG. 8 is a graph showing an insertion loss of the conventional optical bench for a 16×16 channel structure.

FIG. 8 is a graph showing the insertion loss in the input line I(T) and output line J(R) of the conventional optical bench for a 16×16 channel structure, in which the input and output optical fibers and input and output optical elements are arranged along a line. The overall insertion loss is greater than that of FIG. 7 for the optical bench according to the present invention. For the conventional optical bench, the maximum insertion loss (Max) is 5.721 dB, which is greater than that of the optical bench according to the present invention, and the minimum insertion loss (Min) is 2.329 dB. The average insertion loss (Ave) of the conventional optical bench is 3.094 dB with a standard deviation (SD) of 0.859. The average insertion loss (Ave) and the standard deviation (SD) are greater than those of the optical bench according to the present invention. From the results, it is evident that the optical path can be shortened for the optical bench according to the present invention with reduced insertion loss.

Figure 9:
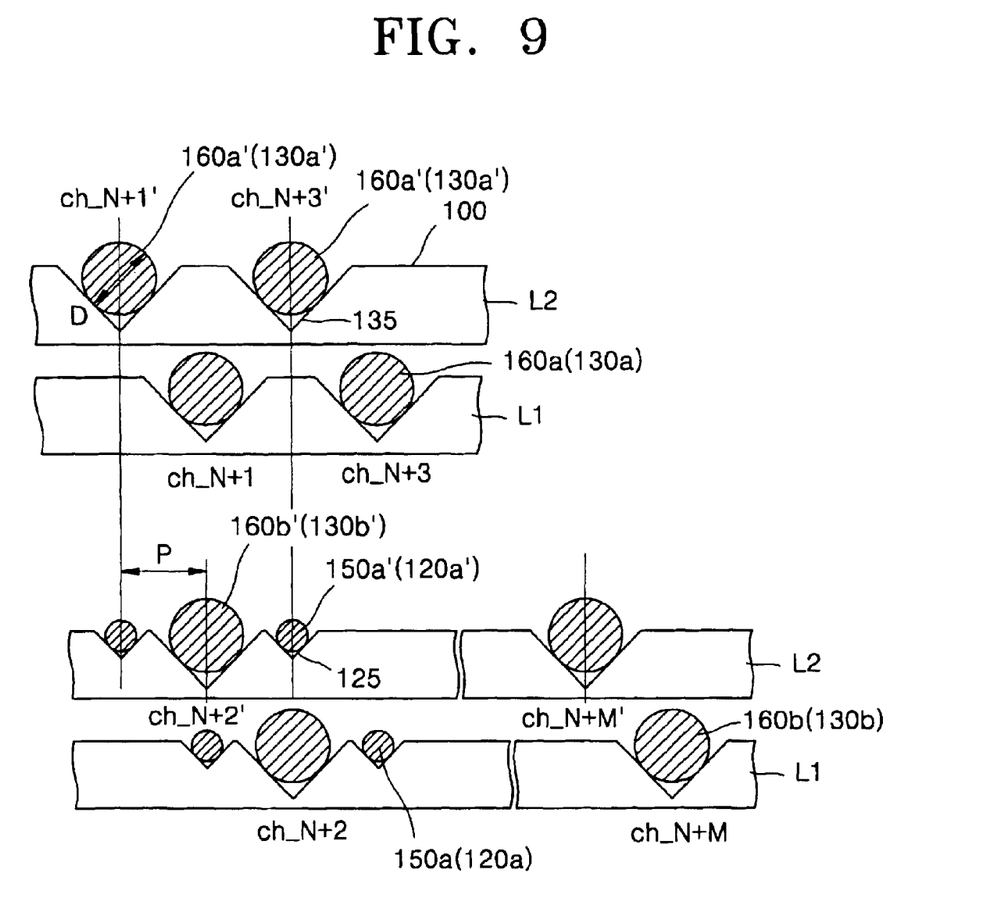
FIG. 9 shows input and output optical fibers and input and output optical elements arranged in different planes, in accordance with an aspect of the present invention.

Referring to FIG. 9, the input and output optical fibers 120a', 120b', 150a', and 150b'are placed in first V-grooves 125 and the input and output optical elements 130a', 130b', 160a', and 160b' are placed in second V-grooves 135. The input and output optical fibers 120a', 120b', 150a', and 150b' are arranged in the first V-grooves 125 with a predetermined separation gap therebetween such that far ends of even input and output optical fibers 120b' and 150b' are closer to an edge of the substrate 100 than far ends of odd input and output optical fibers 120a'and 150a'. The input and output optical fibers 120a', 120b', 150a' and 150b' form a zigzag pattern with the far ends of the odd and even input and output optical fibers 120a', 120b', 150a'and 150b', leaving a space G (as shown in FIG. 4) between neighboring odd input and output optical fibers 120a' and 150a' away from the far end of each of the even input and output optical fibers 120b' and 150b'.

Odd input and output optical elements 130a' and 160a' are arranged at the far ends of the odd input and output optical fibers 120a' and 150a' , and even input and output optical elements 130b' and 160b' are arranged in the spaces G. It will be appreciated that the arrangement of the even optical fibers and optical elements 120b', 150b', 130b', and 160b' and that of the odd optical fibers and optical elements 120a', 150a', 130a', and 160a' may be interchangeable. The space G is designed so as to utilize an unnecessary space formed due to a difference in width between the second V-grooves 135 for the input and output optical elements 130a' and 160a', and the first V-grooves 125 for the input and output optical fibers 120a, and 150a and input and output optical elements 130b' and 160b'.

Alternatively, the input and output optical fibers 120a', 120b', 150a', and 150b', and the input and output optical elements 130a', 130b', 160a', and 160b', which are arranged in a staggered fashion, may be formed as a multi-layer structure, and the input and output fibers 120a', 120b', 150a', and 150b' and the input and output elements 130a', 130b', 160a', and 160b'between levers of the multi-layer structure may alternate. The input optical fibers 120a' and 120b' and the input optical elements130a' and 130b', or the output optical fibers 150a' and 150b'and the output optical elements 160a', and 160b' may be arranged on different planes L1 and L2. Further, the input and output elements 130a', 130b', 160a', and 160b' may be arranged in the staggered pattern on different planes L1 and L2 in connection with the input and output optical fibers 120a', 120b', 150a', and 150b'.

As described above, in the optical bench according to the present invention, the optical fibers and optical elements are arranged in a staggered fashion, so that an overall volume of the optical bench can be reduced with optimized space utilization. In addition, the optical path is shortened so that tolerance for misalignment of optical elements increases, thereby reducing assembly costs. The optical bench according to the present invention has a low insertion loss with a maximum coupling efficiency.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical bench, comprising:
   a substrate;
   input and output optical fibers arranged on the substrate, wherein far ends of odd fibers of the input and optical fibers form a zigzag pattern with even fibers of the input optical fibers and the far ends of the odd fibers of the output optical fibers form the zigzag with the even fibers of the output optical fibers, leaving a separation gap between neighboring odd fibers of the input and output optical fibers away from the far end of each of the even fibers of the input and output optical fibers;
   input and output optical elements arranged at the far end of each input and output optical fiber, respectively, condensing and/or diverging the input and output beams; and
   micro-mirrors receiving the input beam from the input optical elements and reflecting the received input beam toward predetermined channels.

2. The optical bench as recited in claim 1, wherein the optical bench satisfies a relation of $P \leq D$, where P is a channel pitch and D is a diameter of the input and output optical elements.

3. The optical bench as recited in claim 2, wherein the input optical fibers and the input optical elements, or the output optical fibers and the output optical elements are arranged on different planes.

4. The optical bench as recited in claim 2, wherein the input and output optical fibers and the input and output optical elements are arranged as multiple layers and an arrangement for each multiple layer alternates.

5. The optical bench as recited in claim 1, wherein the input optical fibers and the input optical elements, or the output optical fibers and the output optical elements are arranged on different planes.

6. The optical bench as recited in claim 1, wherein the input and output optical fibers and the input and output optical elements are arranged as multiple layers and an arrangement for each multiple layer alternates.

7. The optical bench as recited in claim 1, wherein the input and output elements are arranged in a staggered fashion in connection with the input and output optical fibers.

8. The optical bench as recited in claim 1, wherein the micro-mirrors are arranged in a matrix on the substrate to reflect the input beam from the input optical elements towards a predetermined output channel corresponding to the output optical elements.

9. The optical bench as recited in claim 1, wherein the input and output optical elements comprise one of a ball lens, a GRIN lens, and a collimating lens to condense and/or diverge the input and output beams.

10. An optical bench, comprising:
    a substrate;
    input and output optical fibers arranged on the substrate in a staggered pattern and placed in first V-grooves with a predetermined separation gap therebetween guiding input and output beams;
    input and output optical elements arranged at a far end of each input and output optical fiber, respectively; and
    micro-mirrors receiving the input beam from the input optical elements and reflecting the received input beam toward the output optical elements, wherein far ends of even input and output optical fibers are closer to an edge of the substrate than far ends of odd input and output optical fibers.

11. The optical bench as recited in claim 10, wherein the far ends of the odd and even input and output optical fibers form a zigzag pattern, leaving a space between neighboring odd input and output optical fibers away from the far end of each of the even input and output optical fibers.

12. The optical bench as recited in claim 11 wherein the odd input and output optical elements are arranged at the far ends of the odd input and output optical fibers.

13. The optical bench as recited in claim 10, wherein the far ends of the odd and even input and output optical fibers form the zigzag pattern, leaving a space between neighboring even input and output optical fibers away from the far end of each of the odd input and output optical fibers.

14. The optical bench as recited in claim 13, wherein the even input and output optical elements are arranged at the far ends of the even input and output optical fibers.

15. The optical bench as recited in claim 10, wherein the input and output elements are arranged in the staggered pattern on a same plane in connection with the input and output optical fibers.

16. The optical bench as recited in claim 10, wherein the input and output elements are arranged in the staggered pattern on different planes in connection with the input and output optical fibers.

17. An optical bench, comprising:
    a substrate;
    input and output optical fibers arranged on the substrate in a staggered pattern and placed in first V-grooves with a predetermined separation gap therebetween guiding input and output beams;
    input and output optical elements arranged at a far end of each input and output optical fiber, respectively; and micro-mirrors receiving the input beam from the input optical elements and reflecting the received input beam toward the output optical elements, wherein the input and output elements are arranged forming a multi-layer structure, and the input and output fibers and the input and output elements between layers of the multi-layer structure alternate.

18. The optical bench as recited in claim 10, wherein a minimum optical path is formed so that the input beam passes an odd input optical element and an optical path S which comprises a shortest path between odd input and output optical elements, and is reflected by the micro-mirror nearest to the odd input optical element, and outputs through the optical path S.

19. The optical bench as recited in claim 10, wherein a maximum optical path of the optical bench is formed so that the input beam passes an even input optical element and the input beam is reflected by the micro-mirror farthest from the even input optical element at a distance corresponding to a length T of each optical element and an optical path L, where T denotes the length of each optical element and L denotes the optical path corresponding to the distance between the odd input and output optical elements and the micro-mirror farthest to the same.

20. The optical bench as recited in claim 19, wherein the maximum optical path ($2(T+L)$) comprises:

$$2(T+L)=2\{(T+S)+(N-1)P\}$$

where S denotes a shortest path between odd input and output optical elements, N denotes a number of input channels, and P denotes a channel pitch corresponding to a distance between each optical fiber.

21. The optical bench as recited in claim 20, wherein a relation between the channel pitch P and a diameter D of the input and output optical elements is expressed as:

$$P \leq D.$$

* * * * *